US011054808B2

(12) United States Patent
Wynne et al.

(10) Patent No.: US 11,054,808 B2
(45) Date of Patent: Jul. 6, 2021

(54) MANAGEMENT PLATFORM FOR ADDITIVE MANUFACTURING PRODUCTION LINE

(71) Applicant: Intrepid Automation, San Diego, CA (US)

(72) Inventors: Ben Wynne, Escondido, CA (US); Jamie Lynn Etcheson, San Diego, CA (US); Christopher Sean Tanner, San Diego, CA (US); Robert Lee Mueller, San Diego, CA (US); Ivan Dejesus Chousal, Chula Vista, CA (US)

(73) Assignee: Intrepid Automation, San Diego, CA (US)

(*) Notice: Subject to any disclaimer, the term of this patent is extended or adjusted under 35 U.S.C. 154(b) by 78 days.

(21) Appl. No.: 16/418,759

(22) Filed: May 21, 2019

(65) Prior Publication Data
US 2020/0103857 A1  Apr. 2, 2020

Related U.S. Application Data

(60) Provisional application No. 62/737,421, filed on Sep. 27, 2018.

(51) Int. Cl.
*G05B 19/4155* (2006.01)
*G06N 20/00* (2019.01)

(52) U.S. Cl.
CPC ......... *G05B 19/4155* (2013.01); *G06N 20/00* (2019.01); *G05B 2219/31372* (2013.01)

(58) Field of Classification Search
CPC ...... G05B 19/4155; G05B 2219/31372; G05B 2219/49007; G05B 2219/33034;
(Continued)

(56) References Cited

U.S. PATENT DOCUMENTS 9,604,406 B2  3/2017  Mandavi et al.
9,821,517 B2  11/2017  McGatha et al.
(Continued)

FOREIGN PATENT DOCUMENTS

CN  105825353 A  8/2016
CN  107368268 A  11/2017
(Continued)

OTHER PUBLICATIONS

International Search Report dated Jan. 3, 2020 for PCT Patent Application No. PCT/US2019/051635.

*Primary Examiner* — Tejal Gami
(74) *Attorney, Agent, or Firm* — MLO, a professional corp.

(57) ABSTRACT

Systems and methods for managing an additive manufacturing production line include an additive manufacturing machine having a first sensor and an auxiliary equipment having a second sensor. A server includes security protocols, a workflow module, an industrial Internet of things (IIoT) module and a machine learning module. The workflow module, IIoT module, machine learning module, additive manufacturing machine and auxiliary equipment are in communication with each other using the security protocols. The machine learning module processes feedback from the first sensor and the second sensor to control operation of the additive manufacturing machine through the workflow module and the IIoT module.

26 Claims, 10 Drawing Sheets

(58) Field of Classification Search
CPC ...... G05B 19/4099; G06N 20/00; G06N 3/08; Y02P 80/40
See application file for complete search history.

(56) References Cited

U.S. PATENT DOCUMENTS

| | | |
|---|---|---|
| 10,031,500 B1 | 7/2018 | Diaz et al. |
| 10,046,521 B2 | 8/2018 | Walker et al. |
| 2012/0105903 A1 | 5/2012 | Pettis |
| 2014/0244017 A1 | 8/2014 | Freiwirth et al. |
| 2016/0182309 A1 | 6/2016 | Maturana et al. |
| 2016/0229123 A1 | 8/2016 | Carlson et al. |
| 2017/0150004 A1 | 5/2017 | Webb et al. |
| 2017/0190121 A1 | 7/2017 | Aggarwal et al. |
| 2017/0192414 A1 | 7/2017 | Mukkamala et al. |
| 2017/0242935 A1 | 8/2017 | Wragg et al. |
| 2018/0079029 A1 | 3/2018 | Scott et al. |
| 2018/0117850 A1 | 5/2018 | Schwartz et al. |
| 2018/0339456 A1* | 11/2018 | Czinger ................. B33Y 10/00 |

FOREIGN PATENT DOCUMENTS

| | | |
|---|---|---|
| CN | 206856032 U | 1/2018 |
| WO | 2018127827 A1 | 7/2018 |

* cited by examiner

MANAGEMENT PLATFORM FOR ADDITIVE MANUFACTURING PRODUCTION LINE

RELATED APPLICATIONS

This patent application claims priority to U.S. Provisional Patent Application Ser. No. 62/737,421, filed on Sep. 27, 2018 and entitled "Management Platform for Additive Manufacturing Production Line," the disclosure of which is incorporated herein by reference in its entirety for all purposes.

BACKGROUND

There are many types of additive manufacturing (i.e., 3D printing) systems and methods such as stereolithography (SLA), continuous liquid interface printing (CLIP™), selective laser sintering (SLS), Multi Jet Fusion™ (MJF) and direct metal laser sintering (DMLS). One type of 3D printing utilizes photosensitive polymers (i.e., photopolymers) that cross-link and harden from a liquid resin to a solid polymeric material upon exposure to light. These photoreactive 3D printing systems (PRPSs) typically include a resin pool, an illumination system, and a print platform, where the illumination system projects an image into the resin pool causing a layer of a polymeric object to be formed on the print platform. The print platform then moves the printed layer out of the focal plane of the illumination system, and then the next layer is exposed (i.e., printed).

Conventional photoreactive 3D printing systems operate in an open loop manner relying on fixed process settings that cater to a general-purpose use case. This solution results in poor performance of the parts and produces parts of low quality in a non-repeatable manner. In some cases, process adjustments are made to enable a challenging use case that, when applied to other use cases, render the system performance well below optimal for general less challenging use cases. An alternate approach is to optimize a specific set of printing process parameters for each individual print job. As the number of parameters available to optimize the printing process is quite large, the effort required to create a tuned process for each job can be extensive. The use of a trial and error approach is often employed. The results of this approach to print process optimization is only marginally effective in translating into a successful final product as the conditions existing during the process development work are rarely present during the final part production. Additionally, since the resulting problems with part quality are not detected during the printing process itself, subsequent print jobs and even entire production runs may be completed with the errors going undetected thus rendering all output as scrap and the machine time as lost work. In many cases, there is also a trade-off between printing speed and printed object quality, which is difficult to optimize for different use cases.

As the use of 3D printing continues to grow, 3D printing providers have made their services accessible digitally. For example, a user can upload a part file through a user application interface, enter specifications such as print resolution and material, and receive a quote and estimated delivery time from a vendor. Manufacturers also use digital systems to operate their 3D printers, such as to analyze part files, translate the part files into print instructions, queue the printers, and store information about print jobs. Continued improvement in the management of 3D printers is needed as the industry expands and becomes more complex.

SUMMARY

In some embodiments, a management platform system for managing an additive manufacturing production line includes an additive manufacturing machine having a first sensor and an auxiliary equipment having a second sensor. A server includes security protocols, a workflow module, an industrial Internet of things (IIoT) module and a machine learning module. The workflow module, the IIoT module, the machine learning module, the additive manufacturing machine and the auxiliary equipment are in communication with each other using the security protocols. The machine learning module processes feedback from the first sensor and the second sensor to control operation of the additive manufacturing machine through the workflow module and the IIoT module.

In some embodiments, a method of managing an additive manufacturing production line using a management platform includes receiving, by a server, information for printing a part. The receiving uses security protocols of the server. A workflow module of the server schedules printing of the part using an additive manufacturing machine having a first sensor and processing of the part using an auxiliary equipment having a second sensor. The method also includes processing, by a machine learning module of the server, feedback from the first sensor and the second sensor. An industrial Internet of things (IIoT) module of the server controls operation of the additive manufacturing machine using the feedback processed by the machine learning module. The workflow module, the IIoT module, the machine learning module, the additive manufacturing machine and the auxiliary equipment are in communication with each other using the security protocols

DETAILED DESCRIPTION

Figure 1:
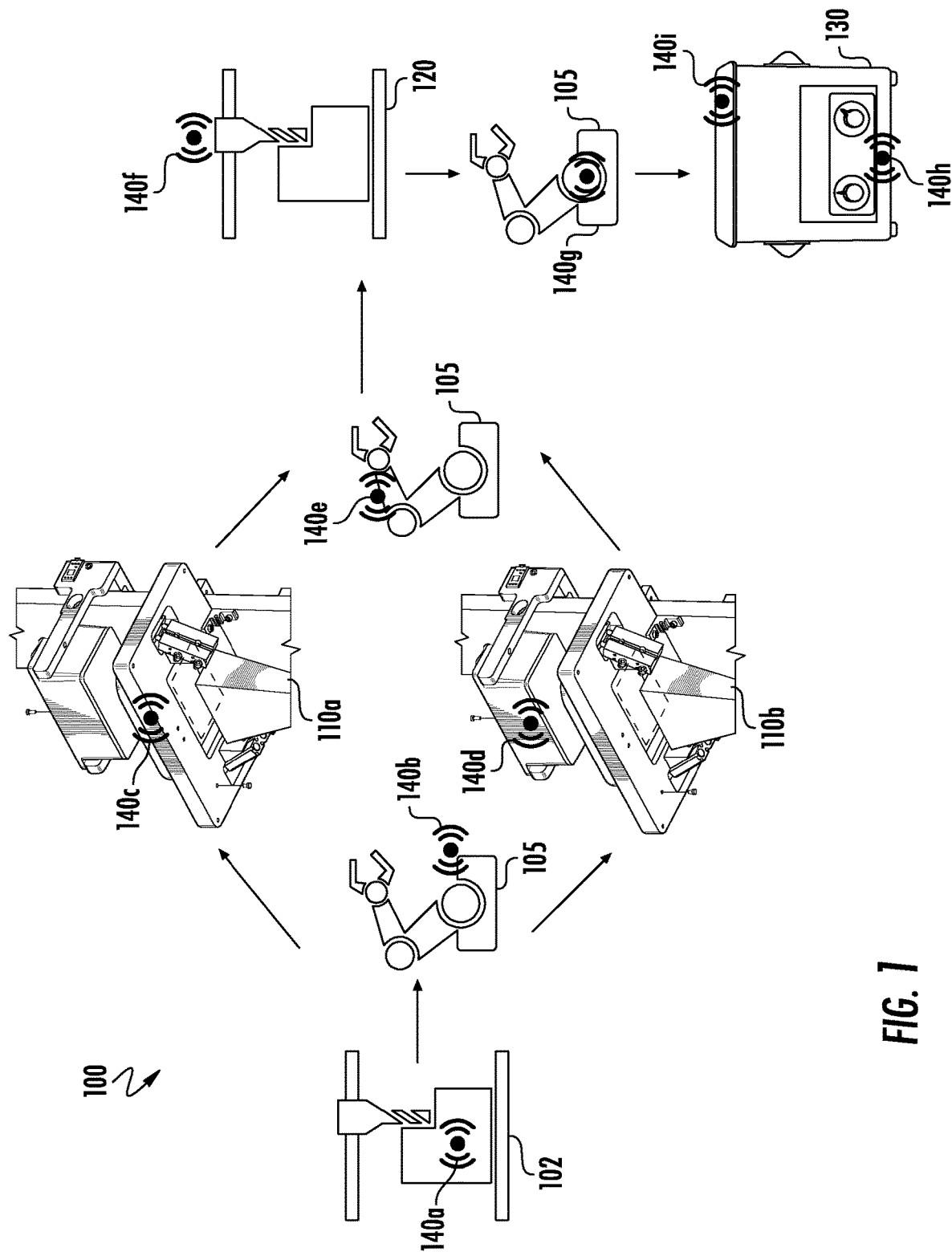
FIG. 1 is a schematic of an additive manufacturing production line, in accordance with some embodiments.

A management platform for an additive manufacturing production line is disclosed where multiple operational aspects are integrated together to create an autonomous digital manufacturing system capable of producing high-quality parts in a consistent, repeatable and traceable manner. The production line includes at least one additive manufacturing (3D printing) machine and one or more pieces of auxiliary equipment. The management platform utilizes sensor feedback from both the 3D printing machine and the auxiliary equipment to control operation of the 3D printer to produce accurate parts in an efficient manner, such as by controlling scheduling and/or machine parameters.

Command and control of digital assets is an issue in conventional systems. Digital assets are sets of digital content, such as computer-aided drawing files (e.g., STL or 3MF files) for 3D parts. Most existing digital systems, like 3D printers, typically have a one-to-one relationship with an operator (i.e., one operator runs each machine). This causes many issues ranging from mistakes caused by human error to various bottlenecks (e.g. human bottlenecks, technology bottlenecks, and process bottlenecks). These issues are exacerbated in a more complex production line containing multiple pieces of manufacturing equipment. Although conventional solutions exist for controlling multiple pieces of manufacturing equipment, such as through Industrial Internet of Things (IIoT) networks, manufacturing companies in many cases are presented with compatibility challenges when attempting to integrate (i.e., "stitch") the various components together in the production system. Conventional off-the-shelf platforms also present a monetary nuisance for users as the platform pricing is feature- and data-usage-dependent. As an example, if a customer desires a certain feature that is outside the scope of an entry level package, they are required to purchase an upgraded package which may include other features not required for their situation. This style of piecemeal offerings results in unnecessary costs to the customer and yields situations of "bloatware" that bog down the manufacturing system.

The present systems and methods uniquely integrate various production and business aspects together using a management platform that communicates with the various equipment of a production line, monitors and analyzes sensor feedback to optimize real-time and future production, and uses machine learning to improve production and business decisions for the production line.

In this disclosure, the terms "additive manufacturing machine," "3D printer," "print engine" and "printer" shall be used interchangeably for any type of 3D printer such as, but not limited to, PRPSs, SLA, SLS, MJF and DMLS. The terms "real-time" and "near real-time" shall be used interchangeably to mean processing tasks without any intentional delay. For example, real-time tasks can be performed as soon as an action has occurred or an instruction has been received, where the immediacy of the action may have some latency (e.g. nanoseconds to several seconds) due to computer processing time or due to communication time between hardware or cloud/software components.

Additive Manufacturing Production Line

FIG. 1 is a schematic of an additive manufacturing production line 100, in accordance with some embodiments. The production line 100 includes at least one additive manufacturing machine, where two 3D printers 110a and 110b are illustrated. The production line also includes auxiliary equipment 102, 105, 120 and 130. Auxiliary equipment 102 may be used prior to printing a part on printer 110a or 110b. For example, auxiliary equipment 102 may be a computer numerical controlled (CNC) mill that prepares a build tray or a scaffold for a 3D printed part. Auxiliary equipment 105 are machines such as industrial robots and/or conveyor systems for moving parts from one station of the production line 100 to another, such as from auxiliary equipment 102 to 3D printer 110a or 110b, or from printer 110a or 110b to auxiliary equipment 120, or from auxiliary equipment 120 to auxiliary equipment 130. Auxiliary equipment 120 and 130 are additional machines for post-processing a printed part, such as modifying the part with auxiliary equipment 120 (depicted as a CNC mill) and cleaning the part with auxiliary equipment 130 (depicted as an ultrasonic bath). In various embodiments, other types of auxiliary equipment may be included in production line 100 such as for curing, machining, coating, surface finishing, inspection and packaging.

In accordance with embodiments of the present disclosure, the 3D printers 110a and 110b and at least one of the auxiliary equipment 102, 105, 120 and 130 each include a sensor (sensors 140a, 140b, 140c, 140d, 140e, 140f, 140g, 140h, 140i) that measures or records a parameter of that equipment. The parameters may be, for example, temperature, weight, acceleration, force, position, thermal distribution, geometrical dimension or viscosity. The location of each sensor 140a-i depends on the parameter being measured or monitored. For instance, sensors 140a and 140f on auxiliary equipment 102 (e.g., CNC mills) may monitor a position of a cutting tool, or a weight or dimensions of the printed part. Sensors 140b, 140e and 140g on auxiliary equipment 105 (e.g., robotic arms or conveying equipment) may monitor movement of different components of the equipment. Sensor 140c on printer 110a may be, for example, a vibration sensor for the printer chassis, and sensor 140d on printer 110b may be a position sensor for the build tray. Auxiliary equipment 130 (e.g., an ultrasonic bath) shows an example of a piece of equipment having more than one sensor. In the embodiment shown, auxiliary equipment 130 has two sensors, sensor 140h for measuring power used and sensor 140i for measuring a temperature of the bath. As shall be discussed in more detail later in this disclosure, the management platform utilizes information from the sensors in conjunction with machine learning algorithms to manage the production line. In operation, the management platform of the present embodiments is in communication with all the machinery of the production line 100 (e.g., 3D printers 110a and 110b; auxiliary equipment 102, 105, 120 and 130; and sensors 140a-i), where the management platform controls operation of and gathers data from all the machinery. The controlling includes scheduling the equipment, providing instructions for processing the part to be made, and providing analysis for production and for business-related decisions. The scheduling can include which printers to use and when (including printers at different geographical locations) and can take into consideration aspects such as availability of devices, service agreements with providers, shipping costs and due dates.

Management Platform

Figure 2:
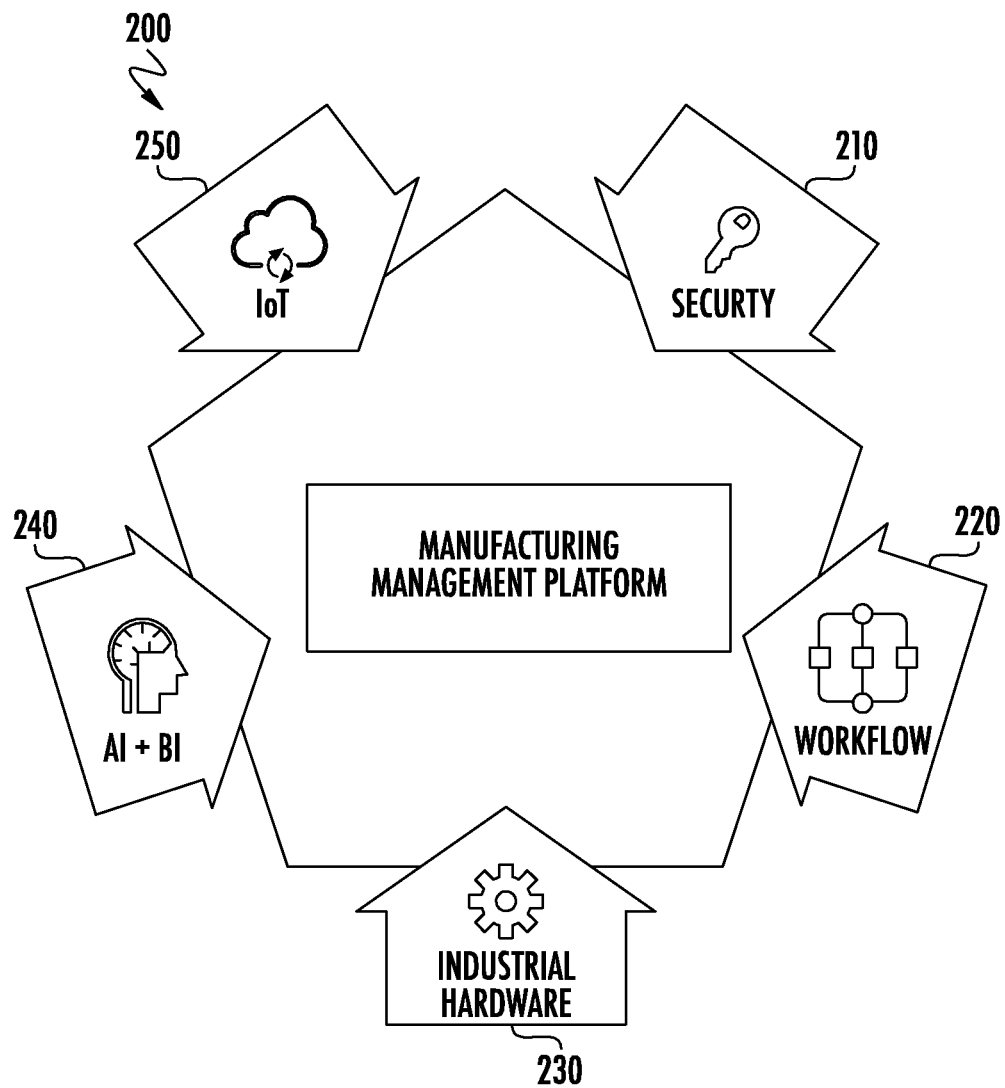
FIG. 2 is a schematic of a management platform for an additive manufacturing production line, in accordance with some embodiments.

FIG. 2 provides a schematic and a brief overview of a management platform system 200 of the present disclosure, showing major entities of the platform and key elements associated with each. The five major entities are security module 210, workflow module 220, industrial assets or hardware 230, artificial intelligence (AI)/business intelligence (BI) machine learning module 240, and cloud-based or hosted Internet of Things (IoT) module 250 for the industrial production line. The system 200 is a vertically integrated management platform seamlessly stitches these entities together, integrating concepts from many different web-based technologies (e.g., IIoT, web applications, web services, notification hubs, software-as-a-service (SaaS)) to create a smart, optimized, and secure digital manufacturing system. The management platform 200 maintains connection with servers at the manufacturing site(s), such as for application logging, and loading/unloading applications, among other functions. Applications used by the production line are directly pulled down using web application programming interfaces (APIs) of the management platform, where in some embodiments the applications may be kept in a main electronic processor memory (e.g., cloud-based) without needing to be committed to persistent mass storage devices, such as disks. In some embodiments, the management platform 200 may be partially or fully cloud-based to facilitate processing and storage of data. The management platform enables the digital content for 3D part files—which can be very large content due to the detailed models involved—to be moved around within the system during various stages of manufacturing such as pre-processing, printing, and post-processing.

The industrial assets 230 are the machine components of the production line, such as those shown in FIG. 1. The 3D printers and other assets utilize industrial mechanics that enable automation of the production line. The assets may include, but are not limited to, various types of 3D printers, machining devices (e.g., CNC mills), conveying equipment (e.g., robotics, belt conveyors, roller conveyors), curing equipment (e.g., chambers for applying heat and/or light), cleaning equipment (e.g., ultrasonic baths), rinsing stations, surface finishing equipment (e.g., polishing, coating), inspection stations (quantitative and/or qualitative assessments of dimensions and part characteristics), and packaging equipment. The industrial assets of a production line may all be at one physical location or may be distributed at different geographical locations. For example, the management platform may be connected to multiple factory sites and can provide instructions for which equipment at what site(s) to be utilized for a particular job depending on, for example, capabilities of the equipment needed for the particular part, scheduling availability, and delivery location of the end customer. The industrial assets are networked together, enabling an automated flow through the production line. The network of industrial assets enables a high availability of equipment for producing parts due to high reliability of the equipment (e.g., printing assets, robotics and industrial automation) and built-in redundancy. The networking of industrial assets also allows the production line to be customer focused by configuring the assets and system for the customer's specific application or production needs.

Security aspects of the security module 210 are uniquely interwoven through all the communications of the management platform, such as but not limited to, within the cloud-based servers, the servers at the manufacturing sites, administrator computers, machine operator computers, machine-specific processors (e.g., built-in or dedicated computers of the industrial assets), and/or networking/communication devices. Security protocols are utilized for receiving, transmitting and storing customer data (e.g., content, usage), for sending instructions and information to and from machinery, and for general handling of data such as for data processing and storage. As an example, security protocols may be utilized for a customer uploading part files to any of the servers or computers of the system, for ensuring an entity's access (e.g., a corporation) to only its own files, and preventing unauthorized access to those files. In other examples, security protocols may be utilized for storing production data related to a particular company, for sending instructions to a machine for a specific production run, and for accessing software applications from the Internet. The security protocols may use known industry standards such as, but not limited to, secure sockets layer (SSL), password hashing, file encryption, and two-factor authentication.

The industrial Internet of Things module 250 is the software infrastructure that connects all the devices in the system including the industrial assets 230 and the computing devices of the management platform. Through the IIoT module 250 infrastructure, each industrial asset serves as an IoT device such that the devices can be operated, reset, and communicated with automatically, via any appropriate means, such as the MTConnect-OPC UA (Unified Architecture) Companion specification. The infrastructure is a centralized command/control system that can be hosted on a physical server at a manufacturing site, or can be cloud-based, or a combination of these. The IIoT infrastructure enables real-time updates and monitoring between all the devices connected to the platform, traceability of parts, content management, and workload management (e.g., queuing). The infrastructure also interfaces with web applications as required, such as to pull or download an application that is needed for a particular print job and to communicate the application to the industrial asset.

Workflow module 220 manages the tasks performed by the industrial assets 230, thus virtually stitching together all the IIoT devices connected to the system. The workflow module 220 performs functions such as communicating with the devices, gathering information from sensors of the equipment, proposing task flows (which can be confirmed by the user in some embodiments), and queuing the tasks to be performed by the equipment. Human verification, such as by personnel of the manufacturer and/or by an end customer, can be included in the steps performed by the workflow module.

Machine learning module 240 includes both artificial intelligence and business intelligence that are utilized at an overall systems level and operated by servers, neural network processors, AI engines, machine learning processors, and the like. AI can be used in, for example, print time estimation, material usage predictions and tracking, waste analysis, real-time monitoring of print quality, and queue/workload optimization. Business intelligence can be used in, for example, tracking and predicting overall trends, providing quality analysis, and supporting sales and marketing analysis and metrics. In some specific examples, AI and BI of machine learning module 240 can be used to manage the scheduling of rush jobs, for early detection of problems using sensor feedback from the equipment, and to provide bid estimation/price quotes, delivery time, and queue estimations. The AI and BI may employ either supervised or unsupervised learning in using feedback (i.e., data) from sensors on 3D printers and/or auxiliary equipment to determine production-centric actions (focused on aspects of the overall production line such as production rate or downtime) or part-centric actions (focused on aspects of the printed part such as part quality).

Figure 3:
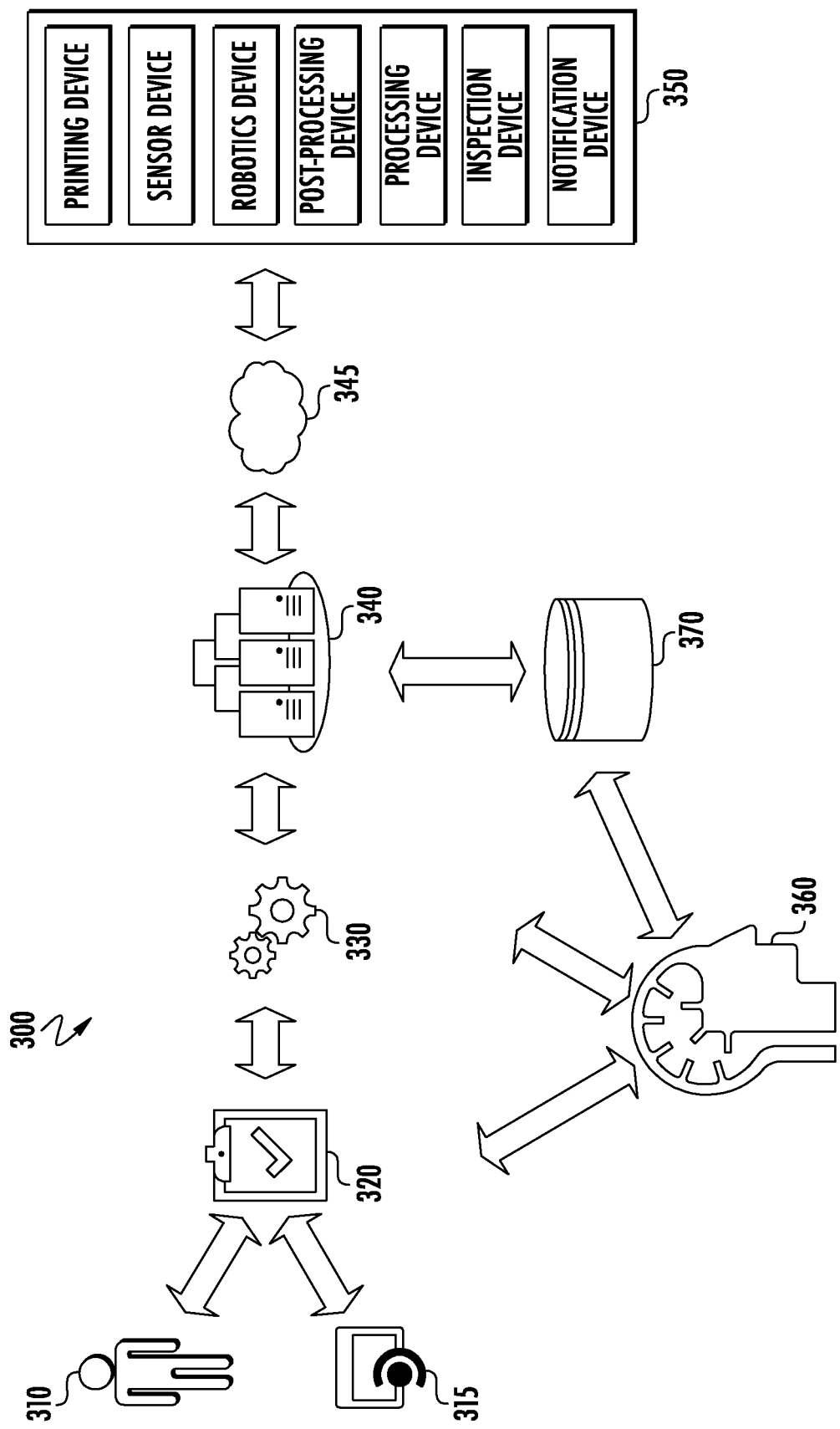
FIG. 3 is a schematic of components of a management platform, in accordance with some embodiments.

FIG. 3 is a schematic of components of a management platform 300, in accordance with some embodiments. In FIG. 3, a user 310 can be an end customer who is requesting a part to be made or may be an operator in the manufacturing facility. The user 310 or an API 315 creates jobs/tasks 320 based on previous jobs or new jobs. Because of security protocols embedded in the management platform, the job data is specific to the user. For example, a user logging in from a particular company can only see jobs and data that their company created. Jobs/tasks 320 are work that need to be done, where each job can contain one or more tasks. Tasks are steps that need to be performed. For example, a task may be a software step or may cause a specific IIoT device to perform an action. Machine learning module 360 interacts with jobs/tasks 320, such as to verify and analyze content or to predict wait times, task times, and queue order.

The created jobs/tasks 320 are queued in a database of the management platform 300 to drive the workflow using workflow module 330. The workflow is software definable actions that can be virtually used together to create a complete manufacturing system. Machine learning module 360 may be used with the workflow module 330 to, for example, optimize wait times, balance workloads and optimize content. The workflow module 330 drives IIoT devices 350 with IIoT module 340 through communication subsystem 345, which may be a LAN, a WAN, the Internet, cloud-based communications, wireless communications, or any combination thereof. The IIoT module 340 is an IIoT hub connection endpoint for the IIoT devices 350. IIoT module 340 provides basic services for functions such as application delivery, device settings, task management, logging and real-time notifications. The IIoT devices 350 can either be used individually or as a collection of devices that work together to create a complete manufacturing system. Example IIoT devices 350 include a 3D printing device, sensor device, robotics device (e.g., to move a printed part from one station to another), post-processing device (such as ultrasonic washing machines, ultrasonic knives for removing supports from the printed part, spinning devices for removing excess resin, air knives for drying parts, coordinate measuring machines for inspection, and CNC machines for fine finishing), processing device (computing systems for handling and managing large amounts of data associated with the print job), inspection device (e.g., measuring dimensional accuracy and/or part quality), and notification device. Notification devices may include, for example, light towers, human machine interfaces, audible buzzers, display monitors to display a status, and other devices and/or programs that provide status indications or communications by visual and/or audible means (e.g., lights, displays, emails, texts).

Data 370 is gathered from sensors in the IIoT devices 350, e.g., through IIoT module 340. The data 370 can include, for example, performance data, process data and device status. Process data can include information from sensors of the IIoT devices as well as other manufacturing data, such as the number of parts produced and downtime due to equipment maintenance. Because process data coming back from the IIoT devices 350 can result in large amounts of data, the data may flow into a data lake, repository or database and be kept as needed based on each job/task use case. As one example, parts manufactured for medical or aerospace applications may require the data to be kept for years, while less critical cases may not require any data to be kept once the part has been completed.

Machine learning module 360 analyzes information from jobs/tasks 320, workflow module 330, IIoT module 340 and data 370 to provide instructions to the workflow module 330 and to control operation of the IIoT devices 350 and in particular, to control additive manufacturing machines in the production line. Controlling operation can include changing machine parameters for a manufacturing run and/or scheduling of the equipment in the workflow. The machine learning module 360 uses AI to process and analyze the device data to perform various tasks, such as to detect manufacturing quality issues, predict hardware failures, and provide process traceability. For example, errors that are detected or predicted during a print run by machine learning module 360 can result in the IIoT module 340 instructing a 3D printer to abort a job, thus reducing material waste and unproductive manufacturing time. In another example, trends in part quality deviation that are measured by post-processing devices (e.g., an inspection station) can be recognized by the machine learning module 360 and corrective action can then be formulated for future 3D print jobs. In some embodiments, the AI may process the feedback in conjunction with a historical database of prior feedback, to learn from past production runs.

Embodiments of a management platform system for managing an additive manufacturing production line include an additive manufacturing machine having a first sensor, an auxiliary equipment having a second sensor, and a server. The additive manufacturing machine and auxiliary equipment are represented, for example, by industrial assets 230 in FIG. 2 and IIoT devices 350 in FIG. 3. The server (see server 600 of FIG. 6), which may be cloud-based, includes security protocols (e.g., security module 210), a workflow module (e.g., workflow module 220 or 330), an industrial Internet of things module (e.g., IIoT module 250 or 340) and a machine learning module (e.g., machine learning module 240 or 360). The workflow module, the IIoT module, the machine learning module, the additive manufacturing machine and the auxiliary equipment are in communication with each other using the security protocols. The machine learning module processes feedback from the first sensor and the second sensor to control operation of the additive manufacturing machine through the workflow module and the IIoT module.

In some embodiments, the auxiliary equipment may include one or more of a curing station, a cleaning station, a conveyor system, a robot, a machining device, or an inspection station. The first sensor or the second sensor (e.g., sensors 140a-i of FIG. 1) may be configured to sense a parameter chosen from the group consisting of: temperature, weight, acceleration, force, position, thermal distribution, geometrical dimension and viscosity. The management platform may access, via the Internet, an application that is specific to a part being manufactured and enable the application to be used by the additive manufacturing machine. In some embodiments, the machine learning module processes feedback from the first sensor or the second sensor to control operation of the auxiliary equipment through the workflow module and the IIoT module. The machine learning module may include artificial intelligence and business intelligence that use the feedback from the first sensor or the second sensor to determine production-centric or part-centric actions, such as to perform analysis regarding predictive hardware failures, production efficiency or quality of a part manufactured by the additive manufacturing production line. In some embodiments, the machine learning module processes the feedback in real-time, during manufacturing of a part, and/or processes the feedback in conjunction with a historical database of prior feedback. In some embodiments, the server is configured to store process data from the additive manufacturing machine and the auxiliary equipment for use by the machine learning module. Controlling operation of the additive manufacturing machine may include using the IIoT module to adjust a print recipe for making a part on the additive manufacturing machine, and/or using the workflow module to control scheduling of the additive manufacturing machine.

Figure 4:
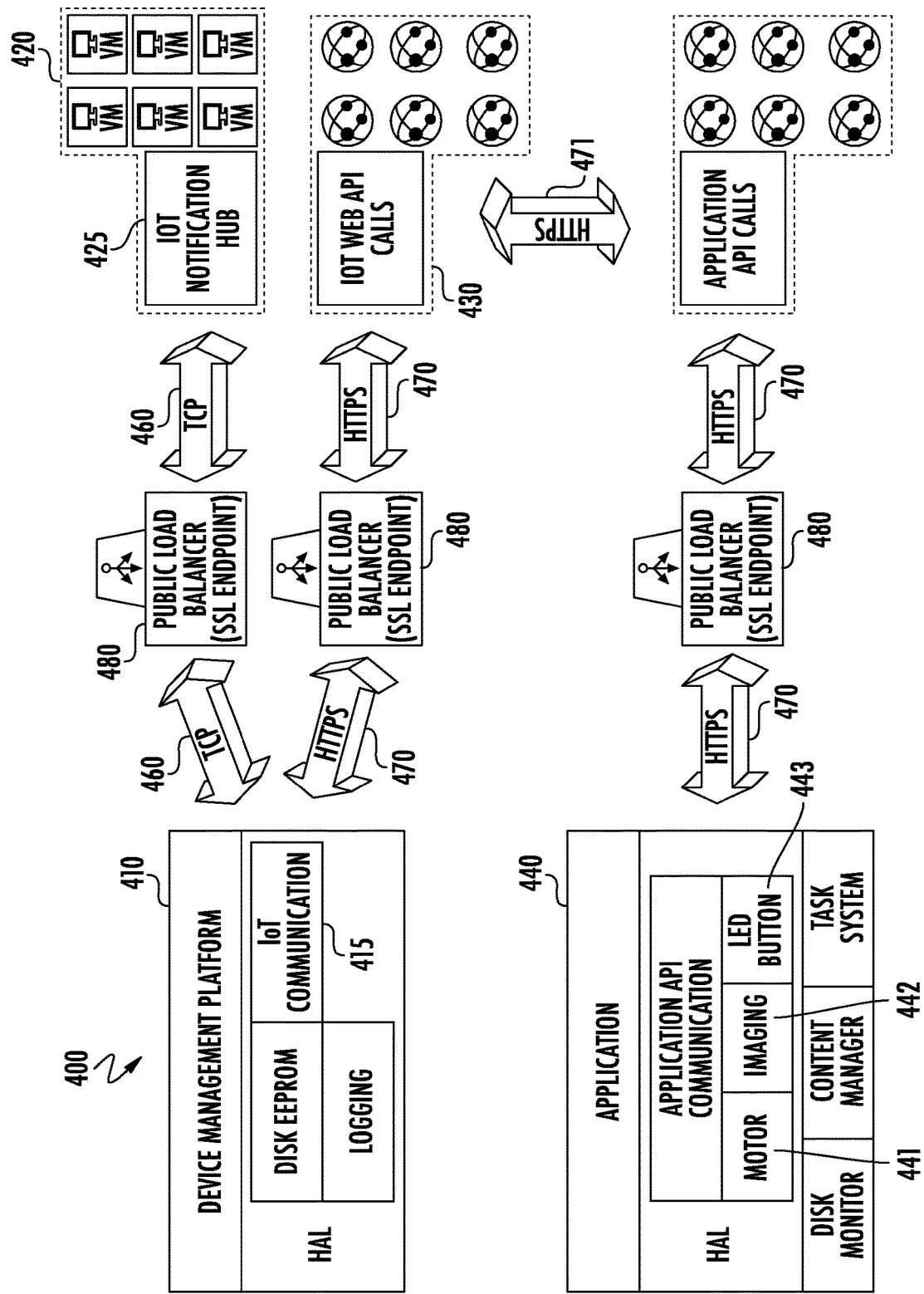
FIG. 4 is a schematic of a management platform loading an application, in accordance with some embodiments.

FIG. 4 is a schematic diagram of an example embodiment of a management platform 400 in accordance some embodiments, where management platform 400 is loading an application 440 to provide additional hardware modules for IIoT devices 420 for a particular job. IIoT devices 420 (e.g., 3D printers and auxiliary equipment) are connected to a server 410 which includes IoT module 415. Communications between components of the management platform 400 and the external application are conducted using security protocols such as transmission control protocol (TCP) 460, hyper text transfer protocol secure (HTTPS) 470 and 471, and load balancers 480. In some embodiments, the communication paths may not require load balancers, or may utilize other cloud networking components. The management platform 400 pulls an application 440 through an IoT web API 430, where the application 440 in this example is for additional motor 441, imaging 442 and LED button 443 hardware modules. The application 440 also calls an application specific API endpoint through HTTPS 471 and has access to the management platform connection if it needs to interact with the IIoT notification hub 425 for IIoT devices 420. The application 440 may be stored on the IIoT devices 420 or may be stored in memory of the management platform 400 rather than requiring storage space on the IIoT devices 420 themselves. The embodiment of FIG. 4 may be used, for example, when a specific technology (e.g., software, firmware) is required for a part being manufactured, and the technology is not intrinsic to the IoT devices 420.

Figure 5:
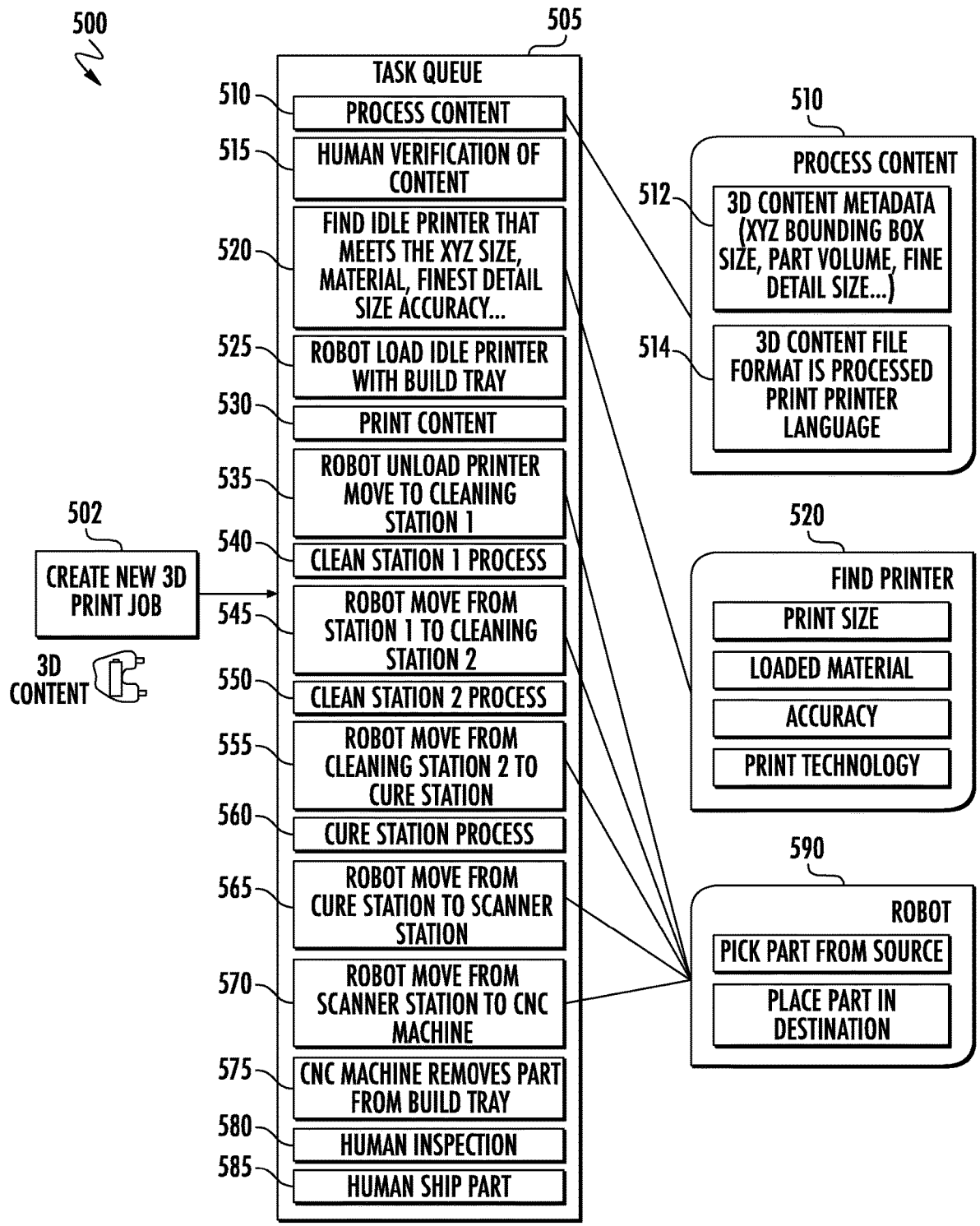
FIG. 5 is a flow diagram of tasks of a management platform for executing a 3D print job, in accordance with some embodiments.

FIG. 5 is an example flow 500 of tasks to generate a 3D printed part from job creation to performing the required tasks. In this disclosure, a job is a virtual container that contains references to data content, settings and workflows which are used to determine what tasks are to be performed by the system. Each task has a defined type (e.g., software algorithm processing, robots, additive manufacturing processes, subtractive manufacturing processes, sensors, scanners) and can contain many complex sub tasks or processing. Some of the task types are directly linked to hardware to perform the task/process. Other task types could be human task/processes or software processing.

In FIG. 5, a new 3D print job is first created at step 502. The workflow module then creates a task queue 505. In step 510 of the task queue 505, process content is inspected for file type (e.g., STL, SVG, STEP) and converted to the correct format. This step 510 may require analysis to look at the type of printer that will be used so that the 3D content file format can be processed (step 514) and the correct output can be created for the printer language. Other tasks 512 may process the 3D content metadata to, for example, build an XYZ measure of the part bounding box, calculate build volume, optimize geometry, and calculate a minimum resolution required. The process content step 510 is primarily a software algorithm task.

In "Human Verification of Content" step 515, the user interface requests a user to validate the output of the process content step 510. In some embodiments, this human verification step may be replaced with an AI algorithm. The management platform then finds a 3D print device in step 520 that meets the requirements of the current job and content. The requirements for finding a 3D printer may be, for example, that the printer is idle, can accommodate the particular XYZ print size, matches the loaded material type, meets the minimum/maximum resolution specifications (i.e., accuracy) and is the desired print technology.

After a suitable 3D printer is identified in step 520, in step 525 a robot retrieves a clean build tray for the type of printer selected and places it in the printer. The printer then prints the content in step 530. In this embodiment of FIG. 5, the robot then unloads the completed printed part from the printer in step 535 and moves it to a first cleaning station where the cleaning station removes excess and/or uncured material in step 540. Next, in step 545 a robot moves the part from cleaning station 1 to cleaning station 2. Cleaning station 2 is a device that removes excess and/or uncured material in step 550. Cleaning station 2 can utilize the same or a different cleaning technology than cleaning station 1, such as but not limited to, ultrasonic washing, air knives, IPA rinse baths, or centrifugal machines. Cleaning stations can also include stations such as steam cleaning to clean build trays and other accessories that are used in 3D printing of parts.

In step 555 another robot moves the part from cleaning station 2 to a cure station, where a curing device is used to complete the curing process in step 560. A robot moves the part from the cure station to a scanning station in step 565, where the scanning station may include, for example, a 3D scanner or a computer vision system to verify quality of parts. After the part is scanned, a robot then moves the part from the scanning station to a CNC machine in step 570 so that the CNC machine (e.g., a mill) in step 575 can remove the part from the build tray, remove build supports from the part and add any required details. A robot moves the part from the CNC machine to a human inspection station, where in step 580 a human can verify any details that were unable to be verified at the scanning station. Finally, the part is shipped in step 585, which can include packaging, labeling and scheduling the shipment.

In the flow of FIG. 5, a robot 590 may be used to pick up the part from a source and place the part at a destination. Separate robots 590 can be used for each station, or one particular robot 590 can be used for one or more steps. For example, the same robot can be used to move the part to cleaning station 1 (step 535) and then to cleaning station 2 (step 545). The same robot may also be used for steps 555, 565 and 570. Also, the robots of FIG. 5 can be the same or different types, and any of the robots can also be replaced by or augmented with other types of conveying equipment. The robots, cleaning stations, cure station, scanning station, CNC mill and inspection stations are all examples of auxiliary equipment in the additive manufacturing production line.

For all the steps in FIG. 5, the management platform manages and modifies the workflow between the devices using the process content and information communicated from the devices. For example, based on sensor feedback from a particular piece of equipment, the platform may determine that the equipment is backlogged and may consequently schedule substitute equipment to be used, or temporarily store a part at an earlier step until the equipment is available. In another example, a customer may desire to view the part at one or more intermediate stages in order to monitor the process. In such a situation, the management platform may remove the part from the production line at the desired stages and then reinsert the part into the workflow after the customer has completed their inspection.

Figure 6:
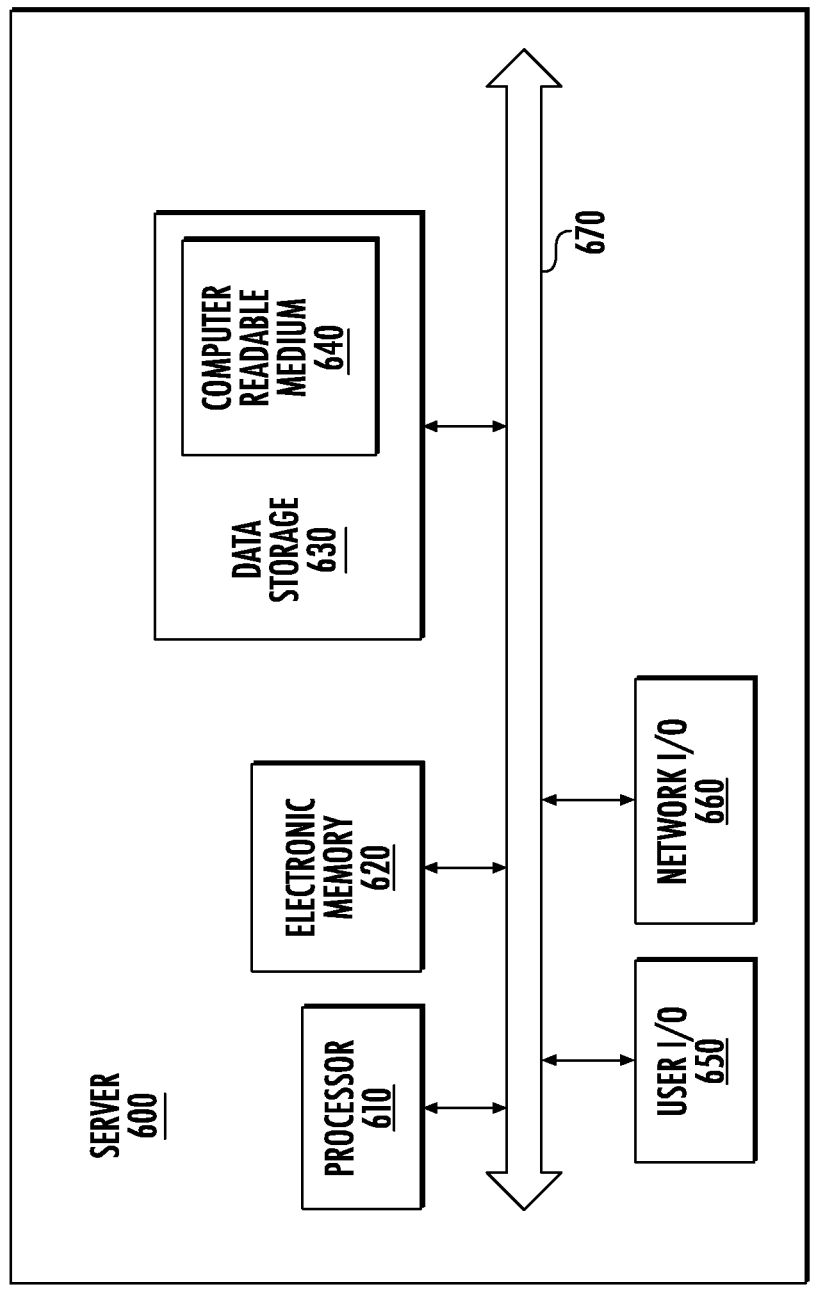
FIG. 6 is a simplified diagram of a server for a management platform, in accordance with some embodiments.

The management platform of the present disclosure may be designed to run on any processor (e.g., X86, X64, Arm, Arm64) and to support various operating systems (e.g., Windows, Linux OS). FIG. 6 is a simplified diagram of a server 600 in which the workflow module, IIoT module and machine learning module of the management platform can be based, along with instructions for security protocols to be used between the various entities of the management platform. Alternatively, the machine learning module may be a neural network processor, AI engine, or machine learning processor.

In the embodiment of FIG. 6, server 600 represents any combination of one or more of the servers for use in the management platform. Other embodiments may use other components and combinations of components. For example, the server 600 may represent one or more physical computer devices or servers, such as web servers, rack-mounted computers, network storage devices, desktop computers, laptop/notebook computers, and the like, depending on the complexity of the management platform. In some embodiments implemented at least partially in a cloud network potentially with data synchronized across multiple geolocations, the server 600 may be referred to as one or more cloud servers. In some embodiments, the functions of the server 600 are enabled in a single computer device. In more complex implementations, some of the functions of the computing system are distributed across multiple computer devices, whether within a single server farm facility or multiple physical locations. In some embodiments, the server 600 functions as a single virtual machine.

In some embodiments where the server 600 represents multiple computer devices, some of the functions of the server 600 are implemented in some of the computer devices, while other functions are implemented in other computer devices. For example, various portions of the management platform can be implemented on the same computer device or separate computer devices. In the illustrated embodiment, the server 600 includes at least one processor 610, a main electronic memory 620, a data storage 630 with computer readable medium 640, a user input/output (I/O) 650, and a network I/O 660, among other components not shown for simplicity, connected or coupled together by a data communication subsystem 670.

The processor 610 represents one or more central processing units on one or more PCBs (printed circuit boards) in one or more housings or enclosures. In some embodiments, the processor 610 represents multiple microprocessor units in multiple computer devices at multiple physical locations interconnected by one or more data channels. When executing computer-executable instructions for performing the above described functions of the server 600 in cooperation with the main electronic memory 620, the processor 610 becomes a special purpose computer for performing the functions of the instructions.

The main electronic memory 620 represents one or more RAM modules on one or more PCBs in one or more housings or enclosures. In some embodiments, the main electronic memory 620 represents multiple memory module units in multiple computer devices at multiple physical locations. In operation with the processor 610, the main electronic memory 620 stores the computer-executable instructions executed by, and data processed or generated by, the processor 610 to perform the above described functions of the server 600.

The data storage 630 represents or comprises any appropriate number or combination of internal or external physical mass storage devices, such as hard drives, optical drives, network-attached storage (NAS) devices, flash drives, solid state drives (SSDs), and the like. In some embodiments, the data storage 630 represents multiple mass storage devices in multiple computer devices at multiple physical locations. The data storage 630 generally provides persistent storage (e.g., in a non-transitory computer-readable or machine-readable medium 640) for the programs (e.g., computer-executable instructions) and data used in operation of the processor 610 and the main electronic memory 620.

The non-transitory computer readable medium 640 includes instructions that, when loaded into the main electronic memory 620 and executed by the processor 610, cause the processor 610 to perform operations including processing sensor feedback, determining workflow queues, analyzing 3D part files and processing machine learning algorithms as described herein.

The user I/O 650 represents one or more appropriate user interface devices, such as keyboards, pointing devices and displays. In some embodiments, the user I/O 650 represents multiple user interface devices for multiple computer devices at multiple physical locations. A system administrator, for example, may use these devices to access, setup and control the server 600. In another example, a customer may use the user I/O devices 650 to input job instructions and to monitor print jobs.

The network I/O 660 represents any appropriate networking devices, such as network adapters, for communicating through the management platform. In some embodiments, the network I/O 660 represents multiple such networking devices for multiple computer devices at multiple physical locations for communicating through multiple data channels.

The data communication subsystem 670 represents any appropriate communication hardware for connecting the other components in a single unit or in a distributed manner on, for example, one or more PCBs, within one or more housings or enclosures, within one or more rack assemblies, or within one or more geographical locations.

One or more aspects or features of the subject matter described herein can be realized in digital electronic circuitry, integrated circuitry, specially designed application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or an assembly/machine language. As used herein, the term "machine-readable medium" (i.e., non-transitory computer-readable media) refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a machine-readable medium. The machine-readable medium can store such machine instructions non-transitorily, such as for example as would a non-transient solid-state memory or a magnetic hard drive or any similar storage medium. The machine-readable medium can alternatively or additionally store such machine instructions in a transient manner, such as for example as would a processor cache or other random access memory associated with one or more physical processor cores.

Methods

Figure 7:
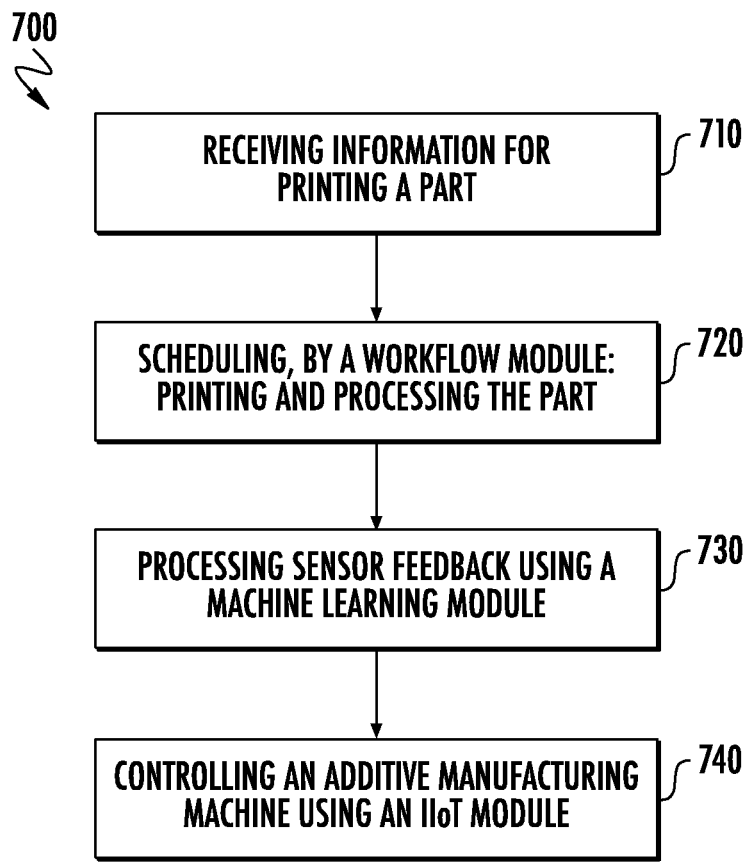
FIG. 7 is a flowchart of methods for managing an additive manufacturing production line, in accordance with some embodiments.

FIG. 7 is a flowchart 700 representing methods of managing an additive manufacturing production line, in accordance with some embodiments. Step 710 involves receiving, by a server, information for printing a part. The server may be cloud-based, such as hosting some or all of the modules in the cloud or performing some or all of the data processing in the cloud. The receiving uses security protocols of the server. In step 720, a workflow module of the server schedules the printing of the part using an additive manufacturing machine having a first sensor, and processing of the part using an auxiliary equipment having a second sensor. Step 730 involves processing, by a machine learning module of the server, feedback from the first sensor and the second sensor. In step 740, an industrial Internet of things (IIoT) module of the server controls operation of the additive manufacturing machine—and optionally also the auxiliary equipment—using the results of the processing of the feedback by the machine learning module. The workflow module, the IIoT module, the machine learning module, the additive manufacturing machine and the auxiliary equipment are in communication with each other using the security protocols.

In some embodiments, the auxiliary equipment may be, for example, a curing station, a cleaning station, a conveyor system, a robot, a machining device, or an inspection station. The first sensor or the second sensor may be configured to sense a parameter chosen from the group consisting of temperature, weight, acceleration, force, position, thermal distribution, geometrical dimension and viscosity. In some embodiments, the method also includes accessing, by the server and via the Internet, an application that is specific to a part being manufactured; and enabling the application to be used by the additive manufacturing machine.

The processing by the machine learning module may include processing feedback from the first sensor or the second sensor to control operation of the auxiliary equipment through the workflow module and the IIoT module. In some embodiments, the machine learning module includes artificial intelligence and business intelligence that use the feedback from the first sensor or the second sensor to determine production-centric or part-centric actions or modifications thereto. For example, AI and BI may be used to perform analysis regarding predictive hardware failures, production efficiency, or quality of a part manufactured by the additive manufacturing production line. In some embodiments, the machine learning module processes the feedback in real-time, during manufacturing of the part, e.g., in order to modify the workflow on-the-fly. In some embodiments, the machine learning module processes the feedback in conjunction with a historical database of prior feedback. In some embodiments, the server may store process data from the additive manufacturing machine and the auxiliary equipment for use by the machine learning module.

In some embodiments, controlling operation of the additive manufacturing machine includes using the IIoT module to adjust printing instructions for fabricating a 3D part (i.e., a print recipe) for making the part on the additive manufacturing machine. The print recipe may be adjusted before, during, and/or after a print run. In some embodiments, controlling the operation of the additive manufacturing machine may include using the workflow module to control scheduling of the additive manufacturing machine.

Additive Manufacturing Machines

Although any type of 3D printer may be used in the management platform of the present disclosure, photoreactive 3D printing systems shall be described to demonstrate example scenarios. The structure of a PRPS and various types of sensors that may uniquely be utilized to control operation of the PRPS shall now be described.

Figure 8A:
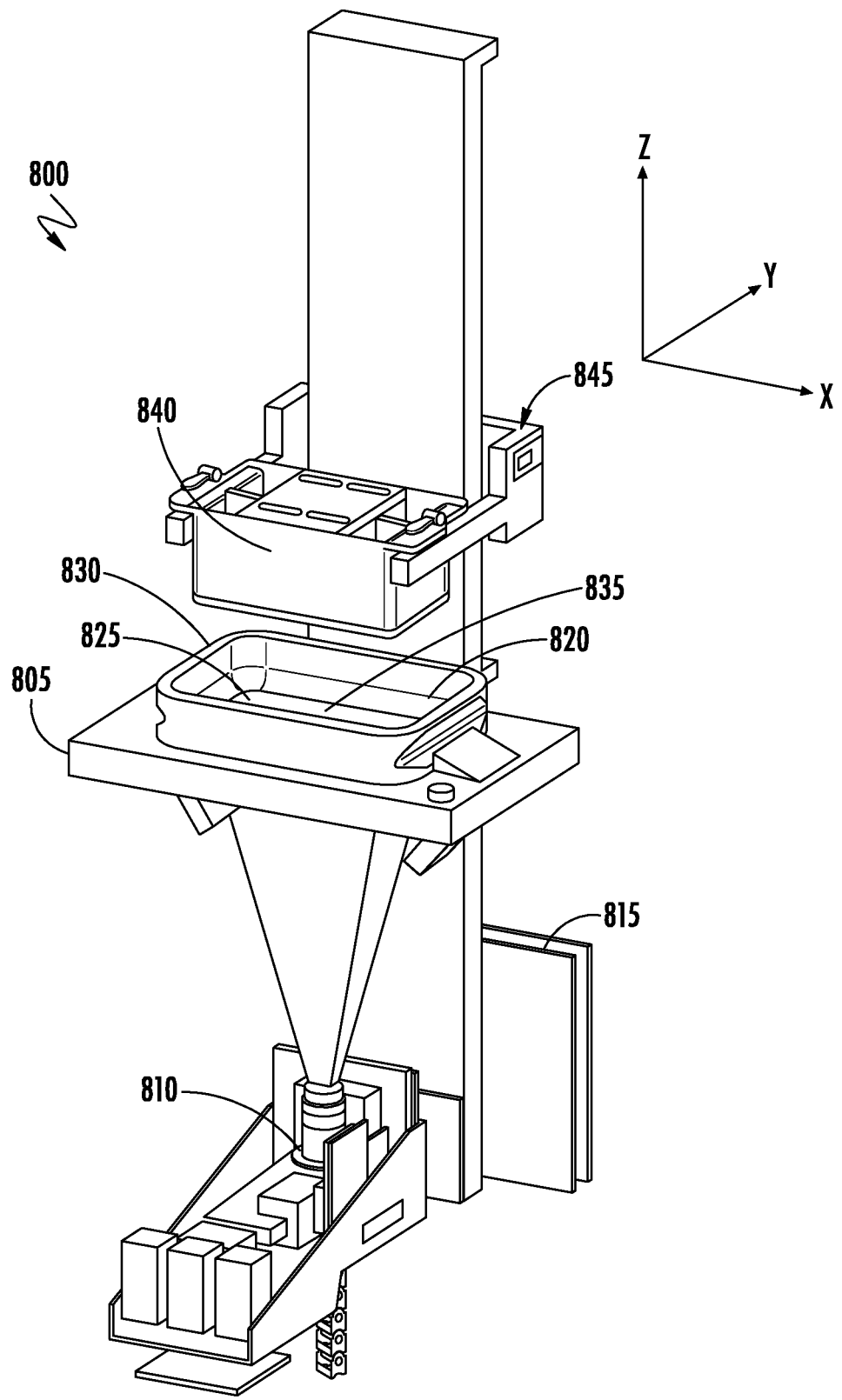
FIGS. 8A-8D are simplified perspective views of example photoreactive 3D printing systems (PRPSs), in accordance with some embodiments.
Figure 8B:
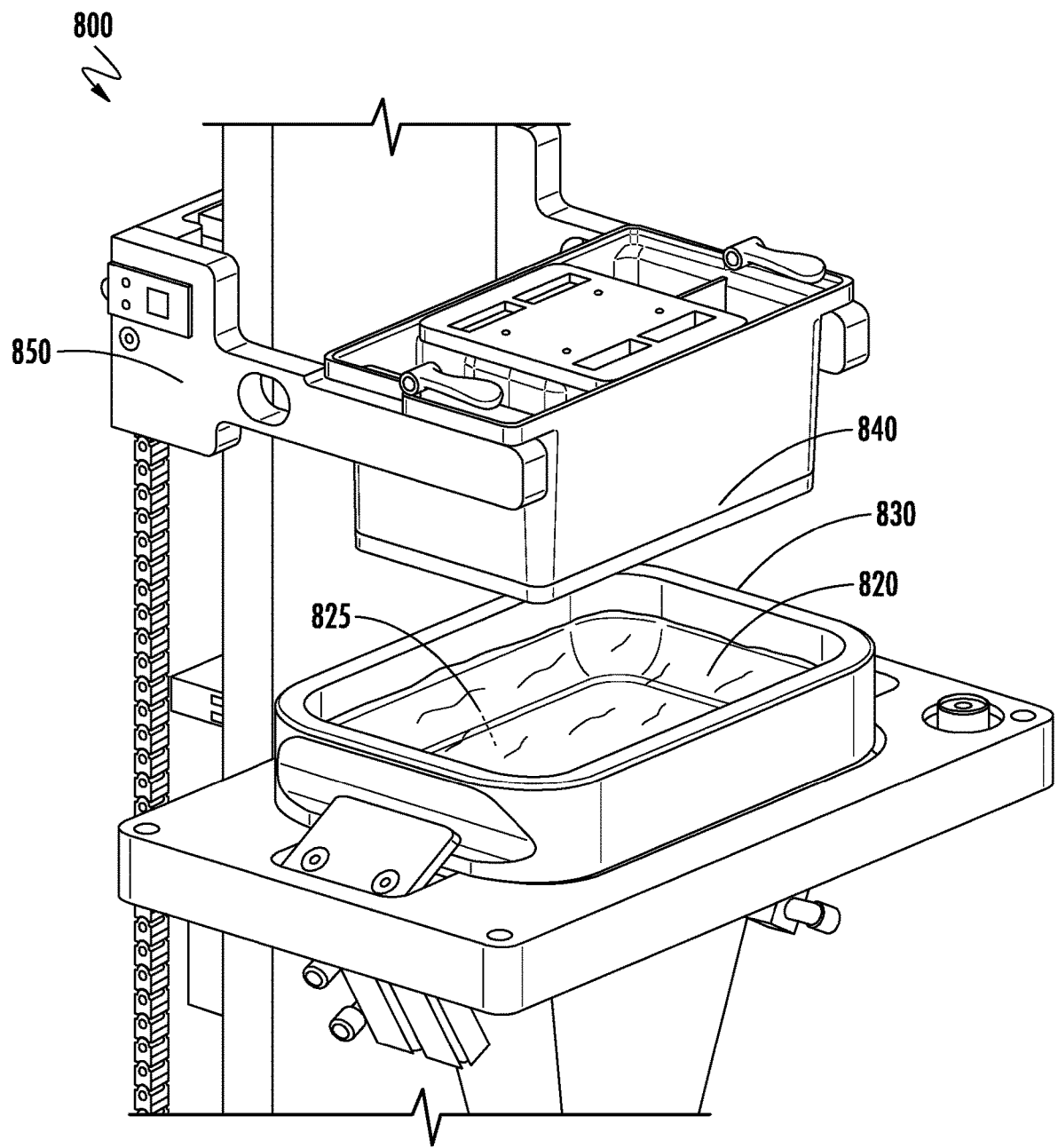
Figure 8D:
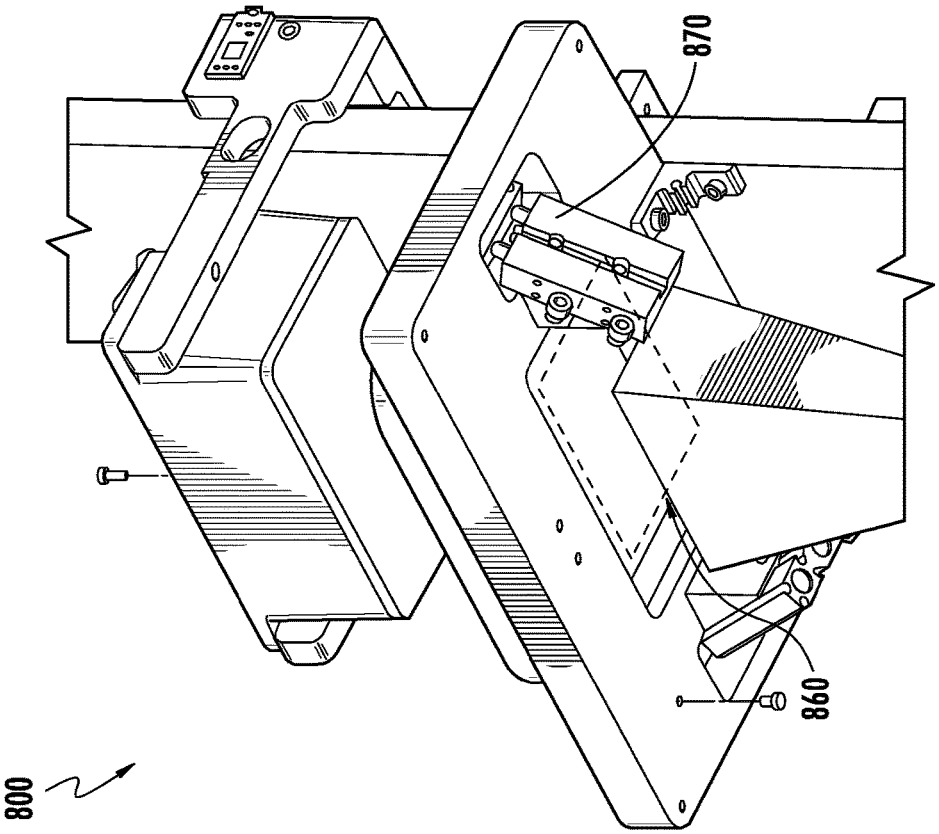
Figure 8C:
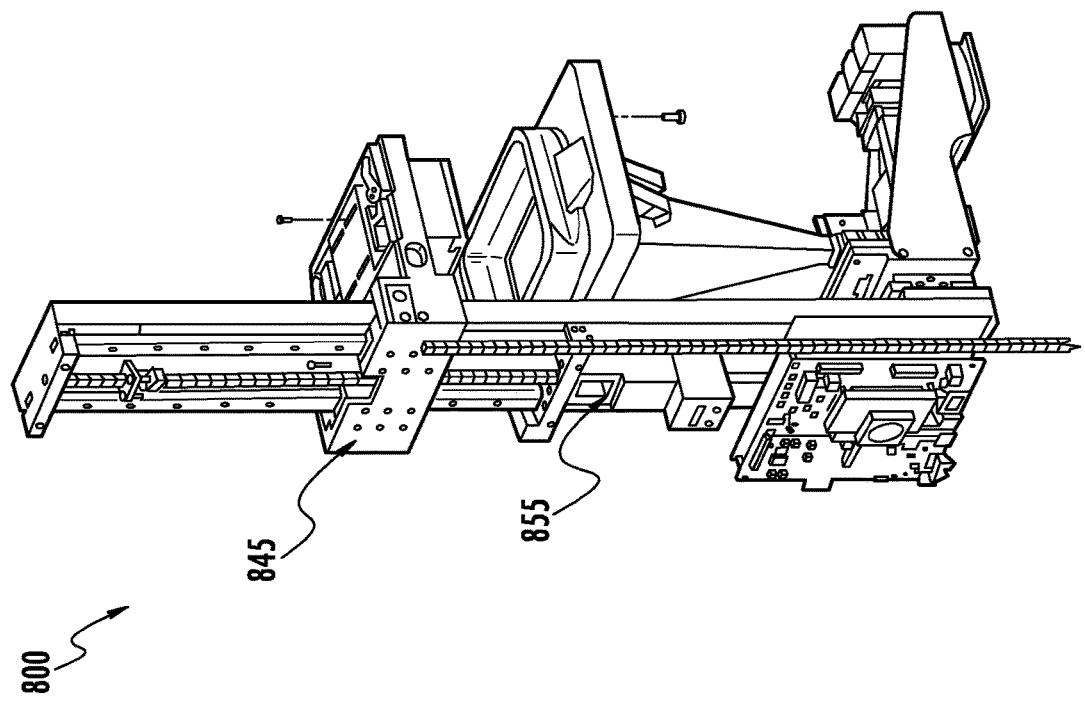

FIGS. 8A, 8B, 8C and 8D illustrate an example of a PRPS 800, in accordance with some embodiments. The PRPS 800 shown in FIGS. 8A-8D contains a chassis 805, an illumination system 810, an image display system 815, a resin pool 820, a polymer interface 825, a resin tub 830, a membrane 835, a print platform 840, an elevator system 845, elevator arms 850 (FIG. 8B), a z-stage 855 (FIG. 8C), a membrane tension apparatus 870 (FIG. 8D), and a build area 860. The chassis 805 is a frame to which some of the PRPS components (e.g., the elevator system 845) are attached. In some embodiments, one or more portions of the chassis 805 are oriented vertically, which defines a vertical direction (i.e., a z-direction) along which some of the PRPS components (e.g., the elevator system 845) move. The print platform 840 is connected to the elevator arms 850, which are movably connected to the elevator system 845. The elevator system 845 enables the print platform 840 to move in the z-direction (as shown in FIG. 8A) through the action of the z-stage 855. The print platform 840 can thereby be lowered into the resin pool 820 to support the printed part and lift it out of the resin pool 820 during printing.

The illumination system 810 projects a first image through the membrane 835 into the resin pool 820 that is confined within the resin tub 830. The build area 860 is an area in the resin pool 820 where the resin is exposed (e.g., to ultraviolet light from the illumination system 810) and crosslinks to form a first solid polymer layer on the print platform 840. Some non-limiting examples of resin materials include acrylates, epoxies, methacrylates, urethanes, silicones, vinyls, combinations thereof, or other photoreactive resins that crosslink upon exposure to illumination. In some embodiments, the resin has a relatively short curing time compared to photosensitive resins with average curing times. In other embodiments, the resin is photosensitive to wavelengths of illumination from about 200 nm to about 500 nm, or to wavelengths outside of that range (e.g., greater than 500 nm, or from 500 nm to 1000 nm). In other embodiments, the resin forms a solid with properties after curing that are desirable for the specific object being fabricated, such as desirable mechanical properties (e.g., high fracture strength), desirable optical properties (e.g., high optical transmission in visible wavelengths), or desirable chemical properties (e.g., stable when exposed to moisture). After exposure of the first layer, the print platform 840 moves upwards (i.e., in the positive z-direction), and a second layer can be formed by exposing a second pattern projected from the illumination system 810. This "bottom up" process can then be repeated until the entire object is printed, and the finished object is then lifted out of the resin pool 820.

In some embodiments, the illumination system 810 emits radiant energy (i.e., illumination) over a range of different wavelengths, for example, from 200 nm to 500 nm, or from 500 nm to 1000 nm, or over other wavelength ranges. The illumination system 810 can use any illumination source that is capable of projecting an image (i.e., pattern) for printing the 3D part. Some non-limiting examples of illumination sources are arrays of light emitting diodes, liquid crystal-based projection systems, liquid crystal displays (LCDs), liquid crystal on silicon (LCOS) displays, mercury vapor lamp-based projection systems, digital light processing (DLP) projectors, discrete lasers, and laser projection systems.

In other embodiments, PRPSs can be inverted with respect to the system shown in FIGS. 8A-8D. In such "top down" systems, the illumination source is above the resin pool, the print area is at the upper surface of the resin pool, and the print platform moves down within the resin pool between each printed layer. The additive manufacturing management platforms with closed loop feedback systems described herein are applicable to any PRPS configuration, including inverted systems. In some cases, the sensors, auxiliary equipment or machine learning can be changed to accommodate a different PRPS geometry, without changing the fundamental operation of the systems and methods disclosed herein.

The PRPS 800 (i.e., additive manufacturing machine) is equipped with one or more sensors that monitor various parameters before, during, and after a print run. The information from the sensors can then be used to alter the printing process during the print run or for future print runs. Closed loop operation, as described by the systems and methods herein, can be beneficial for a variety of reasons, including improved print quality (e.g., printed object structural integrity and object surface roughness), print run duration, and equipment longevity. Manufacturing efficiency and cost effectiveness of the system, as well as system maintenance and serviceability, can also be improved using the systems and methods described herein.

In some embodiments, two or more sensors are integrated in a closed loop feedback system in a production line involving a PRPS, to provide information to adjust parameters of a print run in situ. The relationships between different input parameters (e.g., illumination energy, membrane tension, and print platform movement) and output parameters (e.g., local resin temperature, and force experienced by the print platform during movement) in conjunction with sensor information from auxiliary equipment on the production line are complex, and in many cases not obvious. For example, information from two or more of the following sensors can be used together: z-stage position, direction, and velocity, resin bulk temperature, resin tub down force, resin tub vertical displacement, and elevator arm load sensor. Using the systems and methods described herein, complex interactions between multiple parameters can be measured and accounted for during a print run or in future print runs, resulting in higher quality printed objects.

In some embodiments, the PRPSs described herein contain a 3D print engine, embedded system electronics, and a multitude of sensors (e.g., force gauges, position encoders, proximity/presence detection sensors, viscosity sensors, temperature/humidity sensors, accelerometers, light array sensors). All sensors can continuously and/or periodically acquire their respective data, which then can be fed-back into the management platform. The management platform can process the data and compensate or adjust driving elements in the print engine, in real time during printing or for future print jobs, to optimize print quality and speed.

In some embodiments, a print recipe is used by the PRPS. The print recipe contains information for each layer in a 3D printed part to be built by the PRPS. The job for the part contains the content, print recipe and workflow to apply, and the print recipe is created in the workflow (e.g. steps 510, 515 of FIG. 5) from the 3D content input by a user or API (step 502 of FIG. 5). The print recipe can contain instructions for the PRPS before, during and after a print run. For example, the print recipe can include parameters and instructions related to build geometry, illumination energy, exposure time per layer, wait time between layers, print platform position, print platform velocity, print platform acceleration, resin tub position, resin tub force, resin chemical reactivity, and resin viscosity. In conventional systems, the print recipe is pre-determined before a print run and is static and does not change during the print run. In the embodiments described herein, the print recipe can be updated before, during and/or after the print run. For example, the parameters and/or instructions contained within the print recipe can be updated before, during and/or after the print run based on input from one or more sensors in the additive manufacturing production line. In some embodiments, the print recipe can be updated before, during and/or after the printing of a given layer within the printed object.

Print quality can be affected by many different internal and external factors. Some non-limiting examples of factors that can affect print quality in PRPSs include items such as resin reactivity and its temperature dependency, resin viscosity and its temperature dependency, irradiance level and its variation with multiple factors, move speed, membrane tension, move accuracy, oxygen depletion rates, part geometry, and delamination forces. The overall part quality can be measured by printed object spatial accuracy, structural integrity (e.g., layer to layer adhesion, etc.), mechanical properties, surface finish, and other qualities, all of which can be improved by implementation of the systems and methods described herein.

In some embodiments, additional systems (not shown) are included in the PRPSs described herein to move the resin within the resin pool. For example, the PRPSs described herein can include one or more resin circulation systems (e.g., a system with inlets, outlets and pumps to flow the resin in and out of the resin tub, or a physical mixer within the resin pool to mix the resin within the pool, or a wiper to move resin away from the membrane within the resin pool). Such resin circulation systems can be continuous or intermittent, can reduce the thermal gradients within the resin pool, and/or can provide fresh resin to the membrane (i.e., the print area), either before, during, and/or after a print run in response to one or more feedback parameters measured in the present systems and methods.

In some embodiments the PRPS can include a resin tub (830, FIGS. 8A and 8B) having a unique membrane tensioning system (870, FIG. 8D) with resin tub vertical displacement sensors, which can be used in closed loop feedback systems. The membrane tension can be adjusted at any point during or between prints, where the adjustment can be made automatically in response to feedback information from one or more sensors. The desired level of membrane tension can be based on, for example, material properties of the membrane, print speed, system construction (e.g., if membrane is supported from below or not), resin viscosity, feedback from auxiliary equipment (e.g. measurements at an inspection station) and/or print specifications (e.g., tolerance ranges of the printed part).

In different embodiments, sensors of the present PRPSs can include one or more of a z-stage position sensor, a z-stage velocity sensor, a z-stage acceleration sensor, a resin tub vertical displacement sensor, a sensor for fluid level in the resin tub, an elevator arm load sensor, an accelerometer, a resin bulk temperature sensor, a thermal imaging system, and illumination system sensors. In some embodiments, force (or load) feedback can be obtained from a load sensor (e.g., attached to the elevator load arm) to measure the amount of load experienced by the print platform system in PRPSs, such as to determine if there was an adhesion problem and if the part has delaminated from the print platform. In other embodiments, thermal image feedback can be obtained from the interface between the membrane and the resin (e.g., within the print area) to measure the local temperatures within the resin pool in PRPSs. Having a thermal image map of the print, in real time, enables the image display system to make adjustments to the energy density being emitted to compensate for excessive energy build up in specific spatial locations within a print layer.

In another example, absolute position feedback of the print tray (e.g., from a z-stage position sensor) can be obtained. In some embodiments, the position of the print platform enables several process monitoring and quality enhancements. For example, absolute position feedback enables real-time part geometry checking and monitoring and can determine if the system has undergone a move error or accumulated error that would result in unacceptable part quality. This condition detection, if un-correctable, could then enable the system to abort the job thus eliminating additional raw material waste and machine time overhead. Aborting the job is preferable to completing the errant job, which may take on the order of hours, and then discovering the failed part in subsequent process steps. In some embodiments, absolute velocity and acceleration of the print tray is obtained (e.g., from a z-stage velocity sensor, and/or a z-stage acceleration sensor), and the obtained information is employed to determine if the print process is operating within required process control limits. In some embodiments, this information is used in a closed loop feedback system to control printing parameters such as subsequent layer print tray speeds, and illumination energies. The print platform position, velocity and/or acceleration can also be used in conjunction with the force feedback from the print platform to ensure that process adjustments being made intra-print are being faithfully executed.

In another example, the illumination system can be outfitted with one or more sensors and used for closed loop feedback within PRPSs. Radiant power feedback within the imaging system during the print run enables monitoring and adjusting of the ultimate energy dose for each layer curing event. In another example, a nine degree of freedom gyroscope (i.e., gyro), accelerometer, and/or level indicator can be used to detect kinetic events in PRPSs that could adversely affect the print quality. For example, such movement sensors can detect if the system is bumped, or if the support (e.g., table) upon which the system is sitting has experienced any movement (e.g., from a passing heavy vehicle).

EXAMPLES

Examples of using sensor feedback to control operation of 3D printers and auxiliary equipment of an additive manufacturing production line shall now be described. Although certain types of sensors shall be used as examples, general embodiments may utilize sensors that sense any parameter such as, but not limited to, temperature, weight, acceleration, force, position, thermal distribution, geometrical dimension and viscosity. Furthermore, in general embodiments, a sensor of an IIoT device may be used to affect operation of any equipment on the production line, such as through the workflow module and the IIoT module of the management platform. For example, a sensor on a 3D printer may be used to affect operation of the 3D printer itself (e.g. to adjust a print recipe for making a part) or of other auxiliary equipment. Alternatively, a sensor on an auxiliary equipment may be used to affect its own operation, or of other auxiliary equipment, or a 3D printer.

Example 1: Temperature

In this example, temperature feedback from a wash station is used for production-centric purposes; that is, to keep the production line running. The auxiliary equipment at the wash station is an ultrasonic bath, where the ultrasonic bath has a temperature sensor that may be a thermocouple or any sensor capable of measuring temperature. In addition to temperature, motion sensors can be used at various locations on the bath, such as to provide feedback that the ultrasonic bath is operating if motion is detected. The ultrasonic bath is an IIoT device of the production line, being networked and automated. Management platform communications with the ultrasonic bath are secure, using basic data encryption for data and using SSL for API protocols. In some embodiments, the management platform may download a software or firmware application from the cloud to control the ultrasonic bath hardware such as to read temperature sensors, drive notifications to human readable devices, and drive the wash station. Pulling the application is performed using a secure connection back to the cloud system and may be implemented in a near real-time manner.

The workflow module of the management platform employs and enforces data rules to turn the ultrasonic bath on and off. An example of a data rule is to turn off the bath if the temperature is outside particular minimum or maximum temperature values. In this example of a temperature-controlled system where the ultrasonic bath is the element being driven, the machine learning module of the management platform may utilize AI to process data that triggers data rules that are enforced in the workflow. AI may also be used for predictive hardware failure based on temperatures read from previous trial runs or production usage. For example, driving an ultrasonic wash station in an ever-increasing manner (e.g., as determined by the management platform from trends of higher power and/or longer duration when the bath is in an on-state) to achieve a desired temperature set point may be a sign of hardware degradation in that station and can be used to trigger notification of predictive hardware failure. Motion within the ultrasonic wash station can also be monitored and analyzed in a similar manner. For example, based on motion data collected, AI can employ a variety of actions ranging from warning alerts to automatically aborting the production flow and calling for maintenance action. In such a scenario, the workflow module and IIoT module can utilize the temperature feedback from the ultrasonic bath in conjunction with sensor feedback from an additive manufacturing machine (e.g. a build tray position sensor or resin temperature sensor to determine if the additive manufacturing machine is running a print job) to control operation of the additive manufacturing machine, such as to abort the print job immediately, finish the job and delay the next print job, or reschedule the start of an imminent print job until a later time.

In addition to an automation perspective, AI and BI can be employed in part-centric aspects to determine if any hindered post-processing equipment (e.g., degraded wash stations, ultrasonic baths, curing stations) are impacting the quality of the 3D printed parts being manufactured in near real-time. This is done by having the system automatically correlate detected part quality issues or anomalies with data from potentially degraded equipment to initiate actions such as, but not limited to, instructing a 3D printer to print more slowly, slowing down conveyor systems, adjusting washing profiles and cycle times, or even aborting the print process and/or the production run to minimize waste. Similarly, BI may predict manufacturing/production throughput based on, for example, types and brands of equipment used, equipment usage time, and post-processing profiles and cycle times.

Example 2: Weight

In this part-centric example, weight measurement devices or systems may be used throughout the IIoT devices in the manufacturing flow. The weight measurement devices can be load sensors or other sensors incorporated into the 3D printers and various other machines of the production line. The automated production line is a combination of a 3D printer and other automation stations, where some or all of the stations can have a weight measurement system. Examples of auxiliary equipment that may have a weight measurement system include, but are not limited to, robots, wash stations, spinning stations, or any other equipment that physically comes in contact with the printed part or build tray.

The IIoT module of the management platform may pull an application ("app") down from the cloud to assist in controlling the weight sensor hardware. Example apps include but not are limited to driving notifications to human readable devices; driving printers; driving robotics; and reading strain gauges, load cells and weight measuring sensors. The management platform accesses the app using a secure connection to the cloud system and may perform the action in a near real-time manner.

The weight sensors perform mass, weight and/or strain measurements and can be, for example, local strain gauges or load cells on printer elevator arms, or strain gauges or load cells on robot end effectors. Example uses of the weight measurements include but not are limited to detecting if a part has fallen off a build platform during a print on the printer engine, detecting if a part has been dropped during a wash station, and measuring weights before and after a post-processing station (e.g., a curing station). In another example, a load cell or strain gauge may be incorporated on the end effector of the robot so that the build tray with part weight can be monitored throughout the entire manufacturing process. In short, weight measurement systems may serve as inputs that can be used to determine a variety of actions that may be workflow-based or AI/BI-based. Security protocols are utilized for communications to and from the IIoT devices having weight sensors. The devices use basic data encryption for data and use SSL for API protocols. The management platform that hosts the IoT production line runs all the security.

In the workflow module, data rules for the weight sensors are employed and enforced. There may be rules regarding, for instance, the type of printer in use, weight measurement data stream, and part geometry weight. Furthermore, the use of weight measurement systems may involve AI rules to optimize resin utilization and minimize waste. For example, the machine learning module of the management platform may use AI based on part geometry and resin properties (e.g., weight viscosity, resin temperature) which would be used to determine an expected printed part weight. Analytics would then be performed based on whether the printed part is over or under the expected weight. Overweight parts may be caused by print material being collected in unexpected locations in the part, such as resin being captured in cavities. The presence of excess material in a fabricated part may tie into BI such as for material planning purposes. If parts are overweight (e.g., as determined using feedback from a weight sensor at an inspection station), AI of the machine learning module may trigger excess resin usage alerts in near real-time. The alerts may then trigger part process engineering for controlling the 3D printer (e.g. in the print recipe), to optimize aspects such as part geometry, print orientation and part geometry supports to minimize resin waste. If parts are detected by the weight sensors to be underweight, AI may trigger a print job of the 3D printer to be aborted or to send a warning notification. If the part is at the expected weight, the part is assumed to be good and no driven action is required.

A production-centric example of AI incorporating weight sensor feedback into production flow is a sudden change in load in any part of the manufacturing flow. This sudden change in sensed weight can indicate that either the printed part or build tray or both have fallen off in an unexpected location/time within the manufacturing flow. For example, a sudden change in weight may indicate that a part has fallen off locally at the printer, or the part and build tray have been dropped by a robot, or the part has been dropped at a post-processing station. In this case, such a condition would be detected and AI would employ a variety of actions ranging from warning alerts to an automatic abort routine of a production line (including controlling operation of a 3D printer by shutting it down). Another near real-time action that may be taken is to have the master control system (i.e., workflow module) re-route the manufacturing flow away from the area or station of where the sudden load change incident occurred to keep the manufacturing flow going. BI may also be involved in this scenario, giving rise to analytics or information related to the maximum production throughput (and therefore adjusting the scheduling of a 3D printer) when this condition occurs. The AI and BI information can be provided in near real-time.

Example 3: Acceleration, Shock, Vibration

This example describes accelerometer feedback being gathered for production-centric use, such as predictive hardware failure, as well as part-centric use. In this example, accelerometer devices or systems can be used throughout the manufacturing flow for various purposes. Some example scenarios include, but are not limited to, detecting excess vibrations from the motor control system of a 3D printer, excess vibrations from automation equipment (e.g., high acceleration moves from robotics or conveyor belt machine vibrations), or unexpected bumps encountered by an automated system with multiple print engines and robotics. The acceleration sensors can be any sensor that measures or detects shock, acceleration, velocity, impact or vibration. As described in the previous sensor examples, security is provided for these accelerometer devices using basic data encryption for data and using SSL for API protocols. The hosting management platform runs all the security protocols. The IIoT module of the management platform may pull an app down from the cloud in a near real-time manner, using secure connections back to the cloud system. The app may be used to control the accelerometer hardware, such as by driving notifications to human readable devices, driving printers, driving robotics, or reading acceleration/shock/vibration sensors.

The workflow module applies rules for the accelerometer data based on the print engine and auxiliary equipment (e.g., device, machine, robot) to which it is mounted. Rules between devices may be different. For example, in the specific example mentioned above for equipment getting bumped, rules for an accelerometer mounted on a printer may be different than for one mounted on a robot. Having accelerometers scattered throughout the system (e.g., printer, build plate, robot, output chute) enables automation of the additive manufacturing production line. A stream of data from each accelerometer device is processed with a set of rules and is used to drive actions.

In one example, AI may be used for hardware failure prediction when accelerometer data senses ever-increasing vibration from a printer mechanism during prints. This increasing vibration could be a sign of mechanical wear (e.g. bearing wear, lead screw wear) of the print mechanism and may trigger AI to perform various actions ranging from sending warning notifications to aborting print jobs in near real time. At a higher level, the same type of vibration detection and AI actions can be employed when surrounding automation equipment is wearing out (e.g., conveyor belt vibrations increasing, robot move vibrations increasing). For example, vibration sensor feedback from an auxiliary equipment station that exceeds a certain threshold may prompt the workflow module and IIoT module to adjust print parameters or cease operation of an additive manufacturing machine. At an even higher level, the same type of vibration detection and AI actions can be employed during the presence of nearby high energy vibrations (e.g., earthquake, nearby forklift, nearby machining equipment) to control operation of an additive manufacturing machine. Such AI can give rise to BI actions by performing near real-time commands to reduce speeds in various locations of the manufacturing flow to compensate for excessive vibrations that could otherwise result in unacceptable production part quality. This would have a direct impact to overall production throughput which could be quantified in near real-time.

In another example, AI can be employed to issue an abort routine when a sudden shock event is detected, especially during the printing of base layers that provide the adhesion between the part being printed and the build tray. If the print process is beyond the base layers when the sudden shock event is experienced, AI may use the sensed feedback from auxiliary equipment to make a decision to either continue or to abort a 3D print job depending on the magnitude of the shock. If the print is allowed to continue, the management platform can correlate any part defects with the timing of the shock detection anomaly. BI can be used to determine maximum production speeds due to sudden kinetic energy moves, for example when robotics in the system accelerate quickly to transfer parts between stations. Uneven flow of parts from station to station may throttle the throughput of the production line.

In short, different accelerometers in different locations including local sensors at the printers can give rise several benefits when employed as inputs for AI and BI systems. Examples of these benefits include, but are not limited to, predictive hardware failures, adjustments due to degrading hardware and equipment, resin waste mitigations, and production inefficiency predictions.

Example 4: Position Encoder

This example uses a position encoder in a production-centric manner to identify predictive hardware failure. The position encoder sensors are systems that determine position (absolute or incremental) and that can be used in various aspects of the additive manufacturing production line, such as locally or globally at the automated level. The examples described herein for position encoders can also be applied to displacement sensors. Example scenarios of using encoder systems include, but are not limited to, conditions when the printer z-stage motion control system accumulates position error over time or instantly, or global situations in which a conveyor system accumulates position error over time. The position encoder devices utilize security protocols run by the management platform, such as basic data encryption for data and SSL for API protocols. The IIoT module may pull down apps from the cloud to control the encoder hardware. Examples apps include, but are not limited to, reading position encoders and position sensors, driving notifications to human readable devices, driving printers, and driving robotics. The pulling of apps utilizes secure connections back to the cloud system to pull the apps in a near real-time manner.

The workflow module utilizes workflow rules for the various encoder systems based on their location in the overall automated production line. For example, rules for the z-axis of the printer may be different than those for auxiliary equipment in the automation system such as robots and conveyer systems. As with the previous sensor examples in this disclosure, the encoder systems are accessible via network connections and may be scattered throughout the automated production system, such as being provided on the 3D printer, robot and conveyor system. A stream of data from the position encoder device is processed with a set of rules and is used to drive actions in the production line.

In one example, AI in the machine learning module may use encoder position data from a printer mechanism to detect motor movement inaccuracies during a print job. Predictive hardware failure may be determined if the motor position inaccuracies accumulate over time, which may indicate problems with the motor move system in the printer. Additionally, the same encoder data/information can be used to determine or predict in near real-time if the print in process will be of unacceptable quality. As a resulting action, AI may automatically abort the job if the position error in a local printer is excessive, thus eliminating additional raw material waste and machine time overhead. As an alternative action, AI may allow the print job to continue but adjust print speed and send notification alerts in parallel. The same concept can be applied at a higher-level perspective to auxiliary equipment in the production line automation flow. For example, an encoder system on a conveyor apparatus transferring build trays with parts can be used to predict hardware failure if errors in the accumulated position measurements from the conveyor apparatus grow over time. These position measurements can point to wear and tear of the conveyor belt components such as rollers, bearings and belt tension. The auxiliary sensor feedback may be used to control operation of a 3D printer, such as to change the scheduling of a print job if auxiliary equipment is non-functional.

Using position encoder information, AI can execute a number of near real-time actions ranging from aborting a job to pushing warnings to the master control systems (i.e., management platform) or user, making schedule/queue adjustments, and implementing speed adjustments of the overall flow. BI may also play a role, as speed adjustments that are made to overcome a degrading piece of equipment in the automation flow impacts part production throughput. In addition, BI can be employed to provide performance statistics of the equipment. For instance, in the conveyer belt example, BI may alert a production manager that a particular brand of equipment failed after a certain number of hours and only enabled a production throughput of a certain number of parts.

Example 5: Thermal Imaging

Both part-centric and production-centric aspects are provided in the following thermal imaging system examples. The sensors are thermal imaging systems that are capable of detecting thermal distributions for determining hot spots, temperature, and other thermal parameters. The thermal imaging sensors are used to gauge performance and make adjustments in near real-time using cloud-based systems. One example scenario is a local situation in a printer in which a thermal image map of the print, in near real-time, enables the printer's image display system to adjust the energy density being emitted to compensate for excessive energy build up in specific spatial locations within a print layer. Another example is a situation in which a thermal imager is used to gauge the curing performance of a printed part during post-processing routines.

The thermal imaging devices are network-connected and use basic data encryption for data and SSL for API protocols. The hosting management platform runs the security protocols for communications between the thermal imaging devices and other components of the management platform. The workflow module implements rules for the thermal imaging systems based on the locations of the thermal sensors in the overall manufacturing flow. The rules for the sensors may be different from each other depending on where the sensors are located.

The thermal imaging devices enable automation by being scattered throughout the system (e.g., locally at a printer or globally in various post-processing stations) and being accessible via network. A stream of data from each thermal imaging device is processed with a set of rules used to drive actions at the printer or auxiliary equipment. That is, the thermal imaging feedback from an auxiliary equipment may be used to control operation of a 3D printer. The IIoT module may pull an app from the cloud to control the thermal imaging hardware down, using secure connections back to the cloud system and in a near real-time manner. Example apps include, but are not limited to, reading the thermal imaging sensors, enabling the sensors to provide spatial area temperatures or heat maps, driving notifications to human readable devices, driving printers, driving robotics or driving post-processing equipment.

At a local printer level, AI in the machine learning module can be employed to react to input from a thermal imaging device that is monitoring a resin pool during a print process. As an example, AI can be used to execute adjustments in the display system during the print process to compensate for hot spots. These adjustments for hot spots increase print speed by reducing the need for excessive pump moves, which help maintain a uniform temperature at the print interface but are slow. Preventing hot spots also prevents unwanted material from curing and thus improves dimensional accuracy of the printed parts. The AI used with thermal imaging can give rise to BI such as when a certain heat map signature pattern is recognized with certain resins. For example, BI may provide information on various resins or brands of resins that require less AI hot spot adjustments, consequently leading to higher production throughput.

At a higher or global level, as an example, AI can be employed to react to input from a thermal imaging device monitoring or measuring a part that has undergone curing at a post-process curing station. Depending on the post-cured heat map signature of the part, AI can make a near real-time determination of whether additional curing is required after an initial routine curing cycle time. If the same part is being produced over and over again, AI can refer to previous thermal signatures and automatically adjust equipment controls in near real-time to optimize for the best part quality. That is, the machine learning module may process thermal distribution feedback from auxiliary equipment and sensor feedback from a 3D printer (e.g., print parameters used on previous runs) to control operation of the 3D printer. AI can also be used to determine predictive equipment failure if the cycle time of the curing station continues to increase over time. Furthermore, AI actions can be used to send notifications that the curing station equipment is degrading or to instruct the overall production line to abort the production flow for that particular curing station. These AI actions have a direct impact to BI, as throughput would be hindered. Additionally, BI analytics may be able to determine a mean time between failure for a particular make, brand, design, or topology of the curing station.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A management platform system for managing an additive manufacturing production line, the system comprising:
an additive manufacturing machine having a first sensor;
an auxiliary equipment having a second sensor; and
a server comprising:
security protocols;
a workflow module;
an industrial Internet of things (IIoT) module; and
a machine learning module;
wherein the workflow module, the IIoT module, the machine learning module, the additive manufacturing machine and the auxiliary equipment are in communication with each other using the security protocols;
wherein the machine learning module processes feedback from the first sensor and the second sensor to control operation of the additive manufacturing machine through the workflow module and the IIoT module; and
wherein the control of operation of the additive manufacturing machine comprises using the IIoT module to adjust a print parameter of a print recipe for making a part on the additive manufacturing machine, the print recipe containing print information for each layer in the part.

2. The system of claim 1 wherein the auxiliary equipment comprises a curing station, a cleaning station, a conveyor system, a robot, a machining device, or an inspection station.

3. The system of claim 1 wherein the first sensor or the second sensor are configured to sense a parameter chosen from the group consisting of: temperature, weight, acceleration, force, position, thermal distribution, geometrical dimension and viscosity.

4. The system of claim 1 wherein the management platform accesses, via the Internet, an application that is specific to the part being manufactured and enables the application to be used by the additive manufacturing machine.

5. The system of claim 1 wherein the machine learning module processes feedback from the first sensor or the second sensor to control operation of the auxiliary equipment through the workflow module and the IIoT module.

6. The system of claim 1 wherein the machine learning module comprises artificial intelligence and business intelligence that use the feedback from the first sensor or the second sensor to determine production-centric or part-centric actions.

7. The system of claim 6 wherein the machine learning module performs analysis regarding predictive hardware failures, production efficiency or quality of the part manufactured by the additive manufacturing production line.

8. The system of claim 1 wherein the machine learning module processes the feedback in real-time, during manufacturing of the part.

9. The system of claim 1 wherein the machine learning module processes the feedback in conjunction with a historical database of prior feedback.

10. The system of claim 1 wherein the server is configured to store process data from the additive manufacturing machine and the auxiliary equipment for use by the machine learning module.

11. A method of managing an additive manufacturing production line using a management platform, the method comprising:
   i) receiving, by a server, information for printing a part, wherein the receiving uses security protocols of the server;
   ii) scheduling, by a workflow module of the server:
      printing the part using an additive manufacturing machine having a first sensor; and
      processing the part using an auxiliary equipment having a second sensor;
   iii) processing, by a machine learning module of the server, feedback from the first sensor and the second sensor; and
   iv) controlling, by an industrial Internet of things (IIoT) module of the server, operation of the additive manufacturing machine using the feedback processed by the machine learning module, wherein the controlling comprises using the IIoT module to adjust a print parameter of a print recipe for making the part on the additive manufacturing machine, the print recipe containing print information for each layer in the part;
   wherein the workflow module, the IIoT module, the machine learning module, the additive manufacturing machine and the auxiliary equipment are in communication with each other using the security protocols.

12. The method of claim 11 wherein the auxiliary equipment comprises a curing station, a cleaning station, a conveyor system, a robot, a machining device, or an inspection station.

13. The method of claim 11 wherein the first sensor or the second sensor are configured to sense a parameter chosen from the group consisting of: temperature, weight, acceleration, force, position, thermal distribution, geometrical dimension and viscosity.

14. The method of claim 11 further comprising:
   accessing, by the server and via the Internet, an application that is specific to the part being manufactured; and
   enabling the application to be used by the additive manufacturing machine.

15. The method of claim 11 wherein the processing by the machine learning module comprises processing feedback from the first sensor or the second sensor to control operation of the auxiliary equipment through the workflow module and the IIoT module.

16. The method of claim 11 wherein the machine learning module comprises artificial intelligence and business intelligence that use the feedback from the first sensor or the second sensor to determine production-centric or part-centric actions.

17. The method of claim 16 further comprising performing, by the machine learning module, analysis regarding predictive hardware failures, production efficiency or quality of the part manufactured by the additive manufacturing production line.

18. The method of claim 11 wherein the processing by the machine learning module comprises processing the feedback in real-time, during manufacturing of the part.

19. The method of claim 11 wherein the processing by the machine learning module comprises processing the feedback from the first sensor or the second sensor in conjunction with a historical database of prior feedback.

20. The method of claim 11 further comprising storing, by the server, process data from the additive manufacturing machine and the auxiliary equipment for use by the machine learning module.

21. The system of claim 1 wherein the print parameter is an illumination energy, an exposure time per layer, or a wait time between layers.

22. The system of claim 1 wherein the print parameter is a print platform position, a print platform velocity, or a print platform acceleration.

23. The system of claim 1 wherein the print parameter is a resin tub position, a resin tub force, a resin chemical reactivity, or a resin viscosity.

24. The method of claim 11 wherein the print parameter is an illumination energy, an exposure time per layer, or a wait time between layers.

25. The method of claim 11 wherein the print parameter is a print platform position, a print platform velocity, or a print platform acceleration.

26. The method of claim 11 wherein the print parameter is a resin tub position, a resin tub force, a resin chemical reactivity, or a resin viscosity.

* * * * *